April 19, 1966  E. B. DENTON ETAL  3,247,042
APPARATUS AND METHOD FOR MANUFACTURING LAMINAR MATERIALS
JOINED TOGETHER WITH WET ADHESIVE WEBS
Filed Aug. 27, 1962
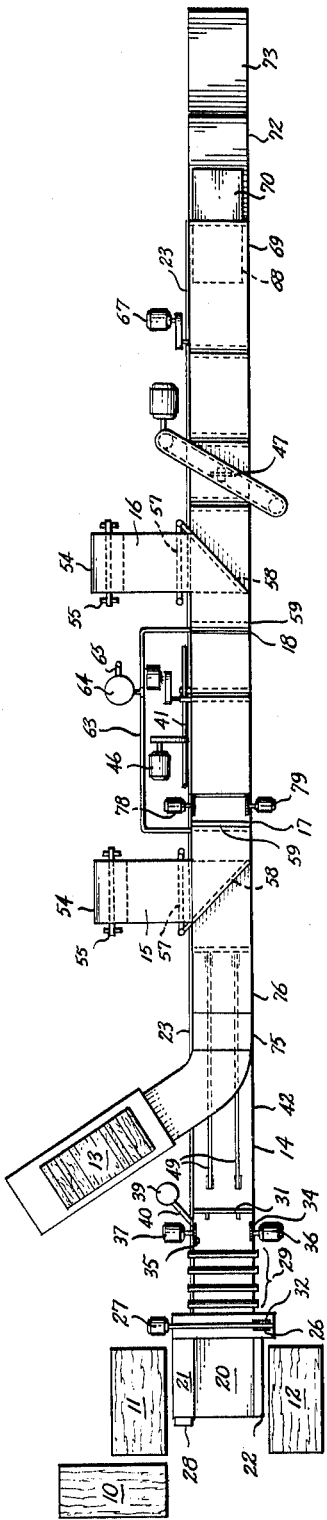
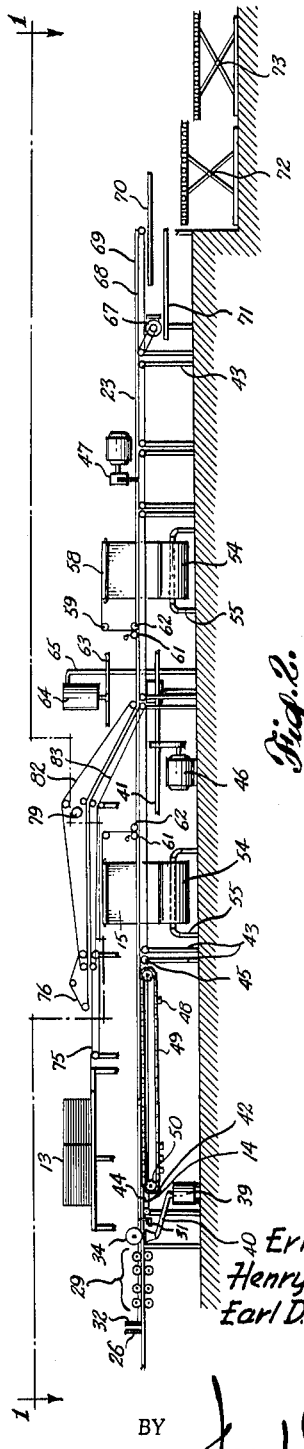
Eric B. Denton
Henry M. Preusser
Earl D. Hasenwinkle
INVENTORS.
BY Jord E. Smith
ATTORNEY United States Patent Office 3,247,042
Patented Apr. 19, 1966

3,247,042
APPARATUS AND METHOD FOR MANUFACTURING LAMINAR MATERIALS JOINED TOGETHER WITH WET ADHESIVE WEBS
Eric B. Denton, Henry M. Preusser, and Earl D. Hasenwinkle, Seattle, Wash., assignors to Weyerhaeuser Company, Tacoma, Wash., a corporation of Washington
Filed Aug. 27, 1962, Ser. No. 219,410
24 Claims. (Cl. 156—288)

This invention relates to manufacturing laminated materials wherein the laminae are held together by adhesives. More particularly the invention relates to substantially continuous flow manufacturing of such laminated materials.

The purpose of the invention, directed both to a method and to apparatus, is to provide reliably bonded laminated products consisting of two or more lamina, such lamina being initially either continuous or noncontinuous, joined together with initially continuous adhesive wet webs which consistently, uniformly, distribute pre-selected quantities of adhesive between laminae during manufacture of the laminated products.

In the manufacture of laminated materials of all types capable of being joined together with adhesives originating from a liquid source just prior to use, there has always been the problem of how to apply the adhesive where wanted in the specified quantity on a continuous production basis.

In addition, there has always been the problem of how adhesively bonded laminae could be controlled in number to manufacture products of different thicknesses, laminaes and/or plies, using substantially the same basic method and/or apparatus.

Substantial progress was made in helping to solve these problems upon development of the "Process of Laminating," wherein wood materials are joined together by first applying a wet adhesive to an absorptive web and thereafter placing the wet adhesive web between the surfaces to be bonded, as described in Donald V. Redfern's patent application Serial Number 37,513, filed June 20, 1960, now abandoned and continued in Serial Number 424,213, filed January 8, 1965.

Continued progress is being made by practicing the method described herein and operating the apparatus shown in the accompanying drawing in which:

FIGURE 1 is a plan view with a section taken along line 1—1 of FIGURE 2, illustrating a substantially continuous production facility for the manufacture of laminated products of two or more laminae; and FIGURE 2 is a side elevation of the continuous production facility shown in FIGURE 1 with added conveyor members and without the laminae receiving table.

The method practiced centers upon the follow-on movement of laminae 10, 11, 12 or 13 commencing solely or in pairs, the election to be explained later, on a conveyor means 14, comprising one or more units, past a location where a continuous web 15 (16) is first drawn through a wet adhesive applicator 17 (18) and thereafter placed in contact with the laminae 10, 11, 12 or 13.

The method as practiced uses the follow-on conveyor movement of laminae 10, 11 or 12 past a wet adhesive web applicator 17 a minimum of one time for laminated materials of two or more laminae when the laminae are somewhat alike in size, grain structure, pattern, etc. On the other hand, where laminated materials are to be produced of two or more laminae 10, 11, 12 or 13, and where one lamina 13 or more may be unlike the other lamina in size, grain structure or pattern, then the follow-on movement of laminae past another wet adhesive applicator 18 is undertaken because the handling of the unlike laminae generally requires modified apparatus. Additional runs by other applicators (not shown) and modified apparatus could be undertaken to accommodate other dissimilar laminae. As additional follow-on movements of laminae past the wet adhesive applicator are required to accommodate different types of laminae, the overall apparatus increases in flow length and additional conveyors are arranged to handle specific laminae materials.

When apparatus is operated in practicing this wet adhesive web method, the resulting module size of laminated materials is controlled by:

(1) The arrangement of apparatus centering on one or more wet adhesive applicators 18;

(2) The partial or complete utilization of a specific arrangement of apparatus;

(3) The insertion of two laminae simultaneously at the commencement of a particular conveyor, the laminae being in close contact with one another free of adhesives to form a parting place between modules; and/or (4) The insertion of additional single lamina near the exit of the apparatus to cover the applied exposed wet adhesive web of a completed module of laminae before contact is made with a follow-on wet adhesive web module.

The method, generally, ultimately requires cutting of the continuous wet adhesive web to separate modules of the laminae. Where the original laminae are all in continuous form the separation is governed by metered lengths. On the other hand where one or more of the original laminae are separate panels, the separation of the wet web is governed by one of the original laminae sizes.

Thereafter, the resulting web separated modules are moved for placement one above the other forming larger modules until the initial or delayed insertion of a single lamina commences the formation of a new module.

To summarize, the multiple choices available in practicing this method, resulting in the production of laminated products of various sizes and construction, are essentially derived from the utilization of the follow-on conveyor movement of laminae past one or more applicators where continuous wet adhesive webs are placed in contact with and consequently moved with the conveyed laminae to another location for additional processing, as necessary, to form various specific end products.

Referring in more detail to FIGURES 1 and 2, the method and apparatus is described more fully with references being made to the production of a specific product line, for example, laminated wood materials such as plywood. Laminae, centers 10, backs 11 and faces 12, separated as to thickness and/or quality are stacked on powered lift tables (not shown) around a receiving table 20 at the start of the conveyor means 14. Depending on the specified ultimate total ply thickness of the resulting manufactured plywood panel, centers 10 and combinations of backs 11 and faces 12 are removed from their respective pile and placed on the table 20 between the guides 21 and 22. Throughout the apparatus the guide line established by guide 21 is substantially followed and tolerances are provided on the side of guide 22. A full length guide 23 is provided, in multiple sections as needed, to continue the reference line established in relation to guide 21.

When the laminae 10, 11, 12 are not presized the successful practice of the method requires trimming of the laminae. After each center 10 or combination of back 11 and face 12 is adjusted next to the guide 21, the laminae (or lamina) are moved to a first rotatable stop (not shown) and the leading edges of the laminae are trimmed by the crosscutting saw 26 powered by motor 27. Following this preparation of the leading edges, controls 28 are used to actuate the powered feed rollers 29 forming the first section of the conveyor means 14 and the laminae (or lamina) are moved to a second rotatable stop 31. This second stop is located to establish a specified distance between the leading laminae (or lamina) edges and a second saw 32 utilized to trim the trailing laminae edges. As illustrated, the saws 26 and 32 are commonly mounted to be powered by motor 27, one saw 26 cutting the leading edges while traveling across in one direction and the other saw 32 cutting the trailing edges while traveling back across in the other direction.

Side edge trimming of the laminae is handled by trimmers 34 and 35 located on each side of the conveyor means 14. The trimmers 34, 35 are powered by motors 36 and 37. A vacuum system having a vacuum chamber 39 and intake ducts 40 is shown in its operating position by one of the trimmers 35 to remove the cuttings. To enhance the clarity of the illustrations, only this vacuum system is illustrated. However, the cuttings from each trimming means are collected in like manner to keep all apparatus substantially free of waste materials.

After completion of these sizing operations, the laminae (or lamina) are carried on further along the conveyor means 14. Sectional construction of the conveyor means is preferred from the operating and maintenance standpoints. The first conveyor section 42, like the others, is supported on legs and framing 43. Motion is transmitted to the laminae by driven belts 44 traveling around wheels 45, some of which are powered. Throughout the conveyor means 14, power is applied to wheels 45 by individual power transmissions (not shown) connected both to shafts supporting such wheels 45 and to the common drive shaft 41 which extends the full length of the apparatus but which is shown only in part on either side of the main coordinating power unit 46.

The conveyor belts 44 could be coextensive with the width of the conveyor means 14 but preferably conveyor belt runs 44 are spaced alongside one another (not shown in FIGURE 1). As multiple conveyor sections 42 are aligned to form the conveyor means 14, the belt runs 44 of respective conveyor sections 42 are staggered providing side-by-side concurrent conveyor operation near adjoining conveyor section ends. In this way production line continuity of the conveyor means 14 is established.

In the manufacture of plywood, as illustrated, where the lamina is not initially continuous, controlled spacing between lamina is helpful in many ways; for example, when sequencing the operation of a wet web adhesive severing means 47. Spacers 48 confined for sliding travel on powered guiding chain belts 49 are utilized to maintain a uniform spacing between lamina or a group of laminae traveling along the conveyor means 14. The spacers 48 are moved into position between trailing and leading edges of respective laminae by paddle-like levers (not shown) driving pairs of spacers 48 between the chain belts 49 and pulley wheels 50. The paddle-like levers are actuated by a mechanical sensing device (not shown) which is triggered by a passing lamina edge.

The spaced lamina or laminae then travel further along the conveying means 14 over the speed coordinated conveyor sections 42 which are powered by the coextending drive shaft 41. At this location the lamina or laminae are passed under weighted guide rollers (not shown but transversely arranged like the top feed rollers 29) which tend to form and to keep all lamina portions in one geometric plane substantially parallel to the conveyor means 14. This forming prepares the lamina for receiving the wet adhesive carrying web 15.

Originally dry, the web 15 is pulled from a large driven roll 54 rotatably mounted on a frame 55. The tensioned dry web 15 is then moved over guide rollers 57, 58 and 59 and others (not shown), as necessary, eventually passing between adhesive carrying and confining driven rollers 61, 62 which tension the web. Liquid adhesives are supplied to the adhesive applying rollers 61, 62 through distribution lines 63 (shown completely only in FIGURE 1) originating at the adhesive reservoir 64 supported on stanchion 65. The quantity of adhesive being deposited is controlled and many factors are considered, such as:
(1) Type of adhesive;
(2) Type of lamina;
(3) Spacing and/or pressure of the application rollers 61, 62;
(4) Temperature; and
(5) Speed of the passing web 15.

The web speed is less than the lamina or laminae speed before contact and the wet adhesive web 15 is pulled along with the lamina or laminae after its initial adhesive attachment to the moving lamina. A roller may be used to guide the web 15 into contact with the lamina.

If two ply material were to be produced this first module of a wet adhesive coated lamina or group of laminae would be passed on directly to the web severing means 47. Thereafter, if double laminae were initially fed to the conveying means 14, then the double laminae covered with the wet adhesive web 15 would proceed on. If only a lamina was initially fed to the conveying means 14, then the lamina covered with the wet adhesive web 15 would at this time be covered with another lamina to complete the two ply material. Thereafter, in either situation, the module is conveyed to special handling means such as a motor 67 powered stacking means 68, comprising an accelerating means 69, movable receiving trays or stacking plates 70, 71, and powered adjustable lift tables 72, 73.

However, most plywood products are manufactured in modules having more plies, such as centers 10 and cores 13 which are both quite often lower in quality and greater in thickness. The grain direction of the cores is arranged generally transversely of the grain direction of the centers 10, backs 11, and faces 12. Also the cores 13 are composed of random widths in contrast to the full lengths of the centers 10, backs 11 and faces 12. Therefore additional handling apparatus is required to preassemble and introduce the rougher non-uniform cores 13 into the overall apparatus when practicing this wet adhesive web method.

Preferably from a raised platform, cores 13 are fed directly to an upper level powered conveyor means 75. Soon thereafter, the cores 13 with their side edges abutting enter a core crowder conveyor 76 which both accelerates the cores 13 and conforms them to restrictive passages defined by both above and below core conveyor chain belts and guides shown in FIGURE 2 (not shown in FIGURE 1, see section line 1—1 in FIGURE 2). The abutting and straightened cores 13 are subsequently conveyed past end trimming means 78, 79 and sized to a length substantially matching the widths of centers 10, backs 11 and faces 12 traveling below on conveyor means 14. Thereafter, the conveyor means 75 has a decreasing elevation section 81 with drive belts 82, 83 which move the core 13 downwardly aided by weighted rollers (not shown). As necessary, a final transition weighted roller conveyor section (not shown) is used to conform and to direct the core 13 into contact with the module below. This lower module is covered with the wet adhesive web and it is being transported on the conveyor means 14 at substantially the core speed. Some speed adjustment means (not shown) is provided, as necessary, on either or both conveyor means 14, 75, to continuously match the conveyor speeds at this common station where the conveyor 75 terminates.

The new module, having the core placed on the wet adhesive web, departs from this common station and travels past wet adhesive web applicator 18 contacting and carrying along the continuous treated web 16. This web 16, in most instances contains and carries substantially the same adhesive in substantially the same quantity.

These latest modules continue on along the conveyor means 14, with the continuous wet adhesive webs 15 and 16 still extending between them, inclusive of some core materials. Soon thereafter a synchronized web severing means 47 is triggered into operation by a passing module edge or optionally by spacing means (not shown) separating the modules along a substantially transverse cutting line.

After this severance in this manufacturing process which uses both the conveyor means 14, 75, and the new module, depending both on the sequence and type of lamina or laminae originally fed to conveyor means 14, comprises either:

(1) A paired face and back, wet adhesive web, core, wet adhesive web;

(2) A center, wet adhesive web, core, wet adhesive web; or (3) A back, wet adhesive web, core, wet adhesive web.

If modules, each comprising paired face and back, wet adhesive web, core, and wet adhesive web, are following along in separated sequence the subsequent utilization of the powered stacking means 68 and a lift table 72 results in the stacking of three-ply plywood panels. The stacking may automatically continue until a plywood press load is ready. A final face member, possibly sent along on the bottom of a following module and timely separated therefrom is placed on the top of the press load to cover the exposed wet adhesive web of the top module.

Thereafter by utilizing an additional lift table 73 and by sequencing the receiving trays or stacking plates 70, 71 the press load of modules is cleared from the apparatus and transported to the press without interrupting the operation of the entire apparatus.

In the press, when necessary, the adhesive bond is made more effective by the application of pressure and possibly heat to the plywood products. As necessary additional cutting and trimming may be undertaken in other apparatus to size the plywood materials to one or more specifications.

If, however, the modules are in a sequence of first, a paired face and back, wet adhesive web, core, and wet adhesive web; second, a center, wet adhesive web, core, and wet adhesive web; and third, a paired face and back, wet adhesive web, core, and wet adhesive web, then the resulting product being stacked by the method and apparatus noted previously, will be five-ply plywood panels.

If, however, the modules include additional centers, following one after the other during a loading sequence, the resulting plywood product will be seven ply, nine ply, etc., depending respectively on the number of centers used—two centers, three centers, etc.

When paired face 12 and back 11 units are not loaded initially along the conveyor means 14 to pre-establish parting lines between modules being stacked to regulate the number of plies per product unit, faces 12 subsequently are placed selectively over the wet adhesive web 16 of passing modules, preferably after the selected modules have been conveyed beyond the web severing means 47.

The practice of this wet adhesive web method utilizing the illustrated apparatus indicates how versatile the manufacturing process is in producing various wood products. In addition to or as a substitution for wood, different materials in continuous strips or separate lamina could be fed to respective conveyor means. Asbestos lamina could be used to form fireproof and fire break panels. Plastic lamina or continuous strips could be combined with wood or with other plastic products to form panels having high gloss durable finishes.

These end products and others could be manufactured with the apparatus as illustrated or with little change of the apparatus. If additional types of material and other variations in the cross sectional structure of a panel were required, additional conveyor means and wet adhesive web applicators would be readily added to the apparatus, again increasing the versatility of the wet adhesive web manufacturing process. Although in most instances the uniformity of the adhesive bond will be desired, patterned types adhesive webs would be used where the adhesive bond could be less than one hundred percent, yet controlled to maintain the reliability of the end product.

What is claimed is:

1. A method of joining laminae, comprising:
   (a) placing a lamina on a conveyor;
   (b) supplying a wet adhesive web applicator with both web material and adhesive;
   (c) preparing a continuous wet adhesive web;
   (d) operating the conveyor to move the lamina past the wet adhesive web applicator;
   (e) applying the wet adhesive web to the lamina as the lamina moves past the wet adhesive web applicator;
   (f) placing lamina on a second conveyor;
   (g) operating the second conveyor to move the second lamina into contact with the wet adhesive web covered first lamina;
   (h) supplying a second wet adhesive web applicator with both web material and adhesive;
   (i) preparing a wet adhesive web;
   (j) applying a wet adhesive web from the second wet adhesive web applicator to the second lamina completing a module comprising first lamina, first wet adhesive web, second lamina and second wet adhesive web;
   (k) cutting the continuous adhesive wet adhesive webs at the termination of the module.

2. A method of joining laminae, according to claim 1, comprising: placing a third lamina on the second wet web completing a laminated material joined by wet web adhesives.

3. A method of joining laminae, according to claim 1, comprising:
   (a) repeating the joining of laminae to fabricate a second like module;
   (b) placing the second like module in contact with the second wet web of the first module.

4. A method of joining laminae according to claim 3, comprising: placing a fifth lamina on the fourth wet web completing a laminated material joined by wet web adhesives.

5. A method of joining laminae, according to claim 1, comprising:
   (a) repeating the joining of laminae to fabricate additional like modules;
   (b) placing the additional like modules in contact with the respective second wet webs of the preceding like modules.

6. A method of joining laminae, according to claim 5, comprising: placing lamina in contact with respective second wet webs of modules at selected intervals of production completing laminated materials of various thicknesses.

7. A method, according to claim 6, of joining laminae, comprising:
   (a) conveying the laminated materials to heating and pressing facilities; and
   (b) operating the heating and pressing facilities to complete the bonding of the laminated materials.

8. A method of joining laminae, comprising:
   (a) placing a lamina on a conveyor;
   (b) supplying a wet adhesive web applicator with both web material and adhesive;
   (c) preparing a wet adhesive web;
   (d) operating the conveyor to move the lamina past the wet adhesive web applicator;
   (e) applying the wet adhesive web to the lamina as the lamina moves past the wet adhesive web applicator, and
   (f) placing a second lamina on the wet adhesive web covering the first lamina completing a laminated material joined by the wet adhesive web.

9. In the method of joining laminae as defined in claim 8, trimming the laminated materials to form panel size units.

10. In the method of joining laminae as defined in claim 9, stacking the panel size units to form multiple ply panels.

11. In the method of joining laminae as defined in claim 10, placing a lamina on the top of the stack of panel size units to complete the top multiple ply panel.

12. A machine for manufacturing laminated products, comprising:
 (a) a conveyor means for transporting continuous and non-continuous lamina;
 (b) a wet adhesive web application means for preparing a continuous web to contain and to carry a wet adhesive and for placing the wet adhesive web in contact with the lamina transported on the conveyor means;
 (c) a severing means for forming panel-like units from the transported lamina covered with wet adhesive; and
 (d) a stacking means for placing the panel-like units one above the other forming laminae bonded stacks.

13. A machine for manufacturing laminated products as claimed in claim 12, comprising:
 (a) a second conveyor means for transporting continuous and non-continuous second lamina into contact with the wet adhesive web covered lamina transported on the first conveyor means before the covered lamina reaches the severing means; and
 (b) a second wet adhesive web application means for preparing a second continuous web to contain and to carry a wet adhesive and for placing the wet adhesive web in contact with the second lamina transported on the first conveyor means before the second lamina reaches the severing means.

14. A machine for manufacturing laminated products, comprising:
 (a) conveyor means for bringing continuous and non-continuous lamina from multiple sources past wet adhesive web preparation and delivery means and thereafter into sequential lamina upon lamina contact; and
 (b) a wet adhesive web preparation and delivery means for receiving continuous web material and wet adhesive, distributing the wet adhesive to passing web material and positioning wet adhesive webs for contact with respective lamina being conveyed from the multiple sources for contact with other wet adhesive web carrying lamina.

15. A machine for manufacturing laminated products as claimed in claim 14, comprising:
 (a) trimming for sizing all lamina; and
 (b) severing means for forming laminated units from the conveyed wet adhesive web contacting laminae.

16. A machine for manufacturing laminated products as claimed in claim 15, comprising stacking means for placing laminated units one above the other.

17. A machine for manufacturing laminated products as claimed in claim 16, comprising a stacking means having an accelerating conveyor to separate the severed laminated units for stacking.

18. A machine for manufacturing laminated products as claimed in claim 17, comprising a stacking means having powered trays for receiving and handling severed laminated units both during unit stacking and machine unloading operations.

19. A machine for manufacturing laminated products as claimed in claim 16 comprising placement means for selectively positioning lamina directly against lamina creating parting lines in stacked laminated units producing laminated products of selected thicknesses.

20. A method of manufacturing laminated products, comprising:
 (a) conveying continuous and non-continuous lamina from multiple sources past wet adhesive web preparation and delivery means, and thereafter into sequential wet adhesive web covered lamina upon lamina contact;
 (b) preparing multiple wet adhesive webs as web material is drawn through wet adhesive contained in wet adhesive web preparation and delivery means;
 (c) positioning the wet adhesive webs in contact with respective conveyed lamina as the wet adhesive web is delivered from the wet adhesive web preparation and delivery means; and
 (d) severing transversely the wet adhesive web laminated material being conveyed, forming multiple product units of the laminated material.

21. A method of manufacturing laminated products as claimed in claim 20, comprising handling the severed product units by accelerating and stacking the product units one above the other, and by selectively inserting lamina free of adhesive between some product units forming ultimate products of preselected number of laminations.

22. A method of manufacturing laminated products as claimed in claim 21, comprising stacking the severed product units by receiving them on a tray as they leave the conveyor means, adjusting the tray for positioning the product units, one above the other, withdrawing the tray for lowering the product units one upon another and supporting several product units on a tray pending removal and replacement of lift tables in line with forming stacks of product units.

23. A machine for manufacturing laminated products, comprising:
 (a) a conveyor means for transporting non-continuous laminae in a spaced apart end to end relation;
 (b) a wet adhesive web application means for preparing a continuous web to contain and to carry a wet adhesive and for placing the wet adhesive web in contact with the lamina transported on the conveyor means;
 (c) a severing means for forming panel-like units from the transported lamina covered with wet adhesive; and
 (d) a stacking means for placing the panel-like units one above the other forming laminae bonded stacks.

24. The method of applying an adhesive-laden paper web upon a horizontally moving panel, comprising:
 (a) feeding a dry paper web at a predetermined linear rate;
 (b) passing said web between a pair of adhesive applicator rollers, the surfaces of which move at linear rate sufficient to impart tension to the said paper web;
 (c) moving the panel to receive said web at a rate of linear travel slightly faster than the rate of movement of said roll surfaces; and
 (d) depositing said web on said moving panel.

References Cited by the Examiner

UNITED STATES PATENTS 2,323,105  6/1943  Welch _____ 156—264

FOREIGN PATENTS 510,803  8/1939  Great Britain.
717,093  10/1954  Great Britain.

EARL M. BERGERT, *Primary Examiner.*

HAROLD ANSHER, *Examiner.*